(12) United States Patent
Zapp

(10) Patent No.: US 7,980,494 B2
(45) Date of Patent: Jul. 19, 2011

(54) SYSTEM FOR RECYCLING OF HDPE FROM MOTOR-OIL CONTAINERS

(76) Inventor: Jorge Zapp, Bogota (CO)

( * ) Notice: Subject to any disclaimer, the term of this patent is extended or adjusted under 35 U.S.C. 154(b) by 182 days.

(21) Appl. No.: 12/315,942

(22) Filed: Dec. 8, 2008

(65) Prior Publication Data

US 2010/0140382 A1   Jun. 10, 2010

(51) Int. Cl.
*B02C 19/00* (2006.01)
(52) U.S. Cl. ............... 241/23; 241/24.11; 241/25
(58) Field of Classification Search .......... 241/24.11, 241/23, 25; 134/12, 40, 22.18, 34; 210/787, 210/781, 173; 264/37.1
See application file for complete search history.

(56) References Cited

U.S. PATENT DOCUMENTS

| | | | | |
|---|---|---|---|---|
| 5,232,607 A | * | 8/1993 | Lundquist | 210/787 |
| 5,316,591 A | * | 5/1994 | Chao et al. | 134/34 |
| 5,711,820 A | * | 1/1998 | Smith et al. | 134/12 |

* cited by examiner

*Primary Examiner* — Mark Rosenbaum
(74) *Attorney, Agent, or Firm* — Juan J. Lizarraga

(57) ABSTRACT

The present invention provides an integral system for recycling post consumer motor-oil plastic containers. Oils and especially motor-oil, physically attaches to its HDPE (high density polyethylene) containers demanding a unique recycling process. As described by this patent, oil-contaminated plastic containers are thermally drained and mechanically freed from their labels and aluminum sealing rings. Unlabeled containers are further shredded through oil-free flake-cutting process, in which, plastic melting is minimized, thus preventing oil to be trapped inside the plastic structure. A hot water bath of sulfonic acid and/or detergents, containing the shredded flakes, is subjected to a very high turbulence in the absence of air (water sealed), which induces liquid cavitation. High rotational turbulence combined with cavitation impacts (generated by fast evaporation/condensation/implosion) supply enough surface energy to liberate the strongly attached oil molecules, which are further trapped by the detergent bath. The bath can be regenerated indefinitely. Centrifugation of the washed flakes, hot and cold water rinsing and further hot-air drying, complete the process before re-pelletizing industrial quality HDPE with the full characteristics of new material.

11 Claims, 6 Drawing Sheets

SYSTEM FOR RECYCLING OF HDPE FROM MOTOR-OIL CONTAINERS

FIELD OF THE INVENTION

The invention relates to various systems and processes for the recycling of used 'high density polyethylene' (HDPE) automotive oil containers. Oil contamination of the plastic surface generates in this case a unique problem, as it attaches in a molecular form to the plastic surface of its commercial container.

BACKGROUND OF THE INVENTION

The recycling of post consumer plastics is rapidly growing in importance due to several factors: a) The increasingly growing cost of plastics as an effect of the oil price in the international markets, allow more advanced technologies to be adopted. b) Oil reserves apparently are on a clear decrease and world economies are struggling for conserving oil for strategic reasons. c) Most plastics are not biologically degradable, representing therefore an unsolvable problem on waste disposal. d) Tighter legislation is obliging producers and users to recycle most plastics.

On the other hand, automotive oil containers made out of 'high density polyethylene' (HDPE) present a unique challenge to recyclers. As oil attaches with molecular forces to its container, conventional washing or dilution have proved to be insufficient to provide an industrially fully reusable material, beyond sub-applications like fence-posts. Used oil containers can be neither washed by conventional processes, nor burned because of contamination generated by oil additives. Used oil containers represent a sizable and undesirable fraction of garbage landfills, as they cannot be easily compacted.

The California Integrated Waste Management Board "Project George" claims to have solved the specific problem of HDPE oil containers recycling (1998), although the process has not been disclosed and no patents have been found for it. The "Project George" process claims that it is a machine that processes the shredded plastic in a closed-loop system without the use of water, detergents, or chemicals that can cause the hazardous discharge of contaminants or additional waste by-products. With this claim, Project George's process would apparently differ from the presently claimed invention, which is based on a completely different process with the natural exception of the conventional shredding process, which otherwise is highly improved in the presently claimed invention for this specific purpose. U.S. Pat. No. 5,232,607 discloses a very high acceleration centrifugal process to directly remove oil strongly attached to oil container chips, whereas the present invention uses low speed centrifugation to remove plain water or small water-oil-detergent emulsion remnants after the main oil removal has already occurred by other means. U.S. Pat. No. 5,227,057 further describes the characteristics of a centrifuge designed to separate oil from plastic flakes without using a wash process or solvents. U.S. Pat. No. 5,711,820 claims a process using supercritical liquid $CO_2$ at very high pressures to remove oil from HDPE contaminated containers. U.S. Pat. No. 5,316,591 further includes the use of high frequency cavitation of supercritical $CO_2$ for the same purpose.

Just in California, some 16 million kilograms of high quality HDPE, coming from discarded oil containers are legally dumped in the landfills carrying along some 1.7 million gallons of harmful motor-oil. The first estimate for the whole United States points to two billion used oil containers and more than 10 million gallons of oil per year.

The primary criterion for plastic recycling is the purity of the end product. In the case of motor oil contamination, fractions in the order of 0.1 percent or more, of oil dissolved in the plastic, progressively impairs its full re-use as an industrial raw material for common products. The process described in the presently claimed invention allows the recuperation of plastic with oil impurities well under those limits.

SUMMARY OF THE INVENTION

The presently claimed invention provides an integral system for recycling post consumer motor-oil plastic containers. Oils and especially motor-oil, physically attaches to its HDPE containers demanding a unique recycling process. In the present invention, oil-contaminated plastic containers are thermally drained and mechanically freed from their labels and aluminum sealing foil residues. Unlabeled containers are further shredded through oil-free flake-cutting process, in which plastic melting is minimized, thus preventing oil from being trapped inside the plastic structure. A hot water bath of special detergents, containing the shredded flakes, is subjected to a very high turbulence in the absence of air (water sealed), which induces liquid cavitation. High rotational turbulence combined with cavitation impacts (generated by fast evaporation/condensation/implosion) supply enough surface energy to liberate the strongly attached oil molecules, which are further trapped by the detergent bath. The bath can be regenerated indefinitely. Centrifugation of the washed flakes, hot and cold water rinsing and further hot-air drying, complete the process before re-pelletizing industrial quality HDPE with the full characteristics of new material.

It is an object of this invention to provide a method for recycling plastic from HDPE engine-oil containers comprising the steps of:

a) Emptying, by the action of gravity on slip-tunnels, slip-channels, slip-conveyors or hooked chain conveyors, the free residual oil remaining inside the engine-oil containers, placed upside down, in an environment between room temperature and 240 degrees F., preferably in an 'Inclined Heated Slip-Tunnel'.

b) Removing the aluminum sealing-foil residue, still attached to said containers' neck, by a high velocity rotating cutting-blade that slices off a small plastic ring with the aluminum residue at the end of the container's neck.

c) Locating said cutting blade on a non radial position with respect to the cutting blade support's shaft in order to induce a sliding action cut, capable of reducing impact and the adiabatical melting of the HDPE in the cutting edge front.

d) Constricting the container's neck by internal and/or external brand-adapted cylindrical spindle, to keep the shape of the container's neck during the said cutting operation to remove said sealing foil residue.

e) Softening the container's paper or plastic label's hot-melt adhesive used to attach said label to the oil container, by surrounding the labeled oil container with a hot air, with or without solvent vapors in a flow between 140 degrees F. and 250 degrees F. for a short time. This process can be performed separately or in the 'Inclined Heated Slip-Tunnel' used for draining free oil from said containers.

f) Removing the engine-oil container's labels, mechanically or by hand, after said melting processes of its adhesive, by the sliding action of a smooth wide blade or a rotating brush.

g) Removing the hot-melt residues still attached to said container after said label and sealing foil residue removal, by applying and/or rubbing a commercial organic solvent to its surface or by a solvent added to the 'adhered-oil removal solution'.

h) Shredding said containers in an 'oil free flake-cutting process'. This shredding is performed after removing the said oil-container's labels and seal residues. Oil contaminated containers are cut into flake-size plastic pieces approximately ½" or less, in its maximum width, as in most plastic recycling processes (i.e. U.S. Pat. No. 5,236,603 and others). As an improvement over the previous processes, the 'oil free flake-cutting process' is claimed in the present invention, in order to avoid trapping oil by plastic melting at the cut surface, as well as undesirable impact. For this purpose, the anvil against which the plastic is cut, is purposely not aligned with the cutting blade shaft to induce a scissors' effect. Blades are shaped approximating as an 'hyperbola of revolution' or a straight blade hyperbolically supported, in order to fit that special misaligned anvil during its rotation.

i) Specially sharpening of the hardened steel cutting blades is also part of the claimed 'oil free flake-cutting process', both for the shredding of flake pieces and also for the removal of said seal residues. A cutting blade attack-angle of 39 degrees, plus or minus ten degrees is claimed, in order to reduce adiabatic melting of the HDPE to further prevent capturing undesirable engine oil in the cut surface. Oil trapped inside the plastic structure remains unwashed in the process.

j) Both the hardened steel cutting blades (shredder and ring cutter) and the hardened steel anvils present a 'relief angle' of 2 degrees to 7 degrees to further reduce the chance of friction chip melting during the said cutting operation, This geometry is also part of said 'oil free flake-cutting process'.

k) Preparing an 'Adhered Oil Removal Solution' (AORS) based on 2 percent to 60 percent content of linear sulfonic acid or another strong detergent and up to 5 percent of an organic commercial solvent, all dissolved or emulsified in water by action of the AORS detergency.

l) Subjecting said oil-contaminated plastic flakes floating in the AORS solution to a rotor-induced high turbulence toroidal re-circulation flow at temperatures between 120 degrees F. and 212 degrees F. This re-circulation occurs inside a cylindrical reactor with two main sections: i) an upper section of quasi-still AORS solution, induced by flat and/or cylindrical or conical screens, which minimize the rotation and vortex formation of the liquid and ii) a submerged high turbulence section where oil separation occurs. The upper quasi-still section (i) with small re-circulation, serves as a gas seal to prevent contamination of the high turbulence underflow with air, as well as a down flow fluid trap to safely introduce said plastic flakes.

m) Generating said high-turbulence underflow of the AORS hot-bath by the action of a high velocity open rotor (10 to 110 ft./sec) at the bottom of a cylindrical reactor, capable of inducing a 'main spiral-toroidal recirculation' of said solution. AORS liquid continuously returns to the rotor by the effect of the cylindrical constraints of the tank's shape as well as by the influence of flat and/or circular vertical screens of the upper quasi-still flow section, screens which are set at an appropriate height to permit the under turbulent whirl.

n) Helping the oil separation from the said flakes, by generating an extreme low-pressure (vapor pressure) peripheral eddy-turbulence ring within the turbulent section, capable of evaporating the AORS hot bath, by the effect of the residual circulation (eddy) rotating in the opposite direction to the main spiral-toroidal flow, this is a purely hydrodynamic effect induced by the momentum conservation principle.

o) Helping the oil separation process by subjecting the AORS hot-bath emulsion during the washing process, to ultrasound frequency vibration between 15,000 cycles and 50,000 cycles per second with intensity equal or higher to 1 watt of free energy per gallon of the 'adhered-oil removal solution'.

p) Extracting said flakes after washing, by a submerged surge located well under the level of the contaminated floating sludge covering said hot-bath. This surge, which avoids recontamination of washed flakes with the surface sludge that naturally forms, can be operated by an external pump or directly by a sector of the reactor's rotor.

q) Protecting the integrity of said floating sludge from the effects of turbulence by submerged horizontal flat and/or conical screens and/or baffles and sinks at the top of said bath container, which isolate the dynamic conditions in the upper section from the high turbulence of the lower section of the reactor.

r) Regenerating the AORS removal solution, after repeated flake cleaning operations, by reducing its temperature to room conditions or less, which changes its product of solubility, in order to mechanically separate the floating oil-sludge from the regenerated solution.

s) After the wet flakes are extracted, recuperating part of the AORS oil-removal solution still covering said extracted flakes, by further low speed centrifugation (less than 20 g) of the batch.

t) Immediate soaking the removed flakes in hot water to remove any remaining 'adhered oil removal solution' (AORS) still attached after centrifugation.

u) Washing any small remnants of said solution, attached to the clean flakes, by subsequent batch baths, in increasingly pure cold-water tanks.

v) Drying the cleaned HDPE flakes by the action of pressurized hot air on a static or a fluidized bed.

w) Although most of the processes of flake treatment after the main oil removal (claims r), s), t) and u)) are of conventional use, its sequence as a whole embodiment is claimed The whole process can be achieved in batches, as well as in a continuous form.

It is a further object of this invention to provide an alternative process in the method for recycling plastic from HDPE engine-oil containers comprising the following:

a) Emptying, by the action of low speed centrifugation (less than 20 g), the free residual oil from the engine-oil containers, in an environment between room temperature and 240 degrees F.

b) Removing the aluminum seal residue by melting the hot-melt adhesive used to glue the sealing-ring to the container's neck, by rapid heating the neck with hot air, hot liquid, steam or superheated steam, at temperatures between 140 degrees F. and 240 degrees F.

c) Removal of the cold or preheated said aluminum sealing foil residue by a brush or a rotating blade with its axis coinciding with the container's neck axis.

d) Removing the sealing foil residue by a direct blow of high-speed steam.

e) Softening the container's paper or plastic label's hot-melt adhesive used to attach it to the oil container for its further removal by a sudden application of water, heated between 140 degrees F. and 212° degrees F.

f) Softening the container's paper or plastic label's hot-melt adhesive used to attach it to the oil container for its further removal by a sudden application of high velocity airflow between 140 degrees F. and 250 degrees F. during a few seconds.

g) Softening the container's paper or plastic label's adhesive used to attach it to the oil-container for its further removal by a sudden application of high velocity steam or superheated steam bath or jet.

h) Softening of the hot-melt adhesive on the paper or plastic label (attaching it to said container) by scratching its impermeable styrene-butadiene gloss surface with small cutting blades or a wire brush, to further allow the action of an organic solvent on the hot-melt adhesive for the further removal of the label.

i) Removing the engine-oil container's labels, immediately after any of said adhesive melting processes, by the sliding action of a smooth wide blade coated with Teflon.

j) Generating a high turbulence bath by the action of continuous or intermittent high velocity submerged jets of said solution impinging the plastic flakes.

k) Subjecting under pressure, the said plastic high turbulence pressurized toroidal recirculation hot-bath filled with the 'adhered-oil removal solution' (AORS), at temperatures between room temperature and 250 degrees F.

l) Drying of the cleaned HDPE flakes by the action of hot air by a forced flow through the static said flakes.

m) Drying of the cleaned HDPE flakes by the action of hot air in a free flow drying tower or in a tumbling mechanism.

DETAILED DESCRIPTION OF THE INVENTION

Figure 1:
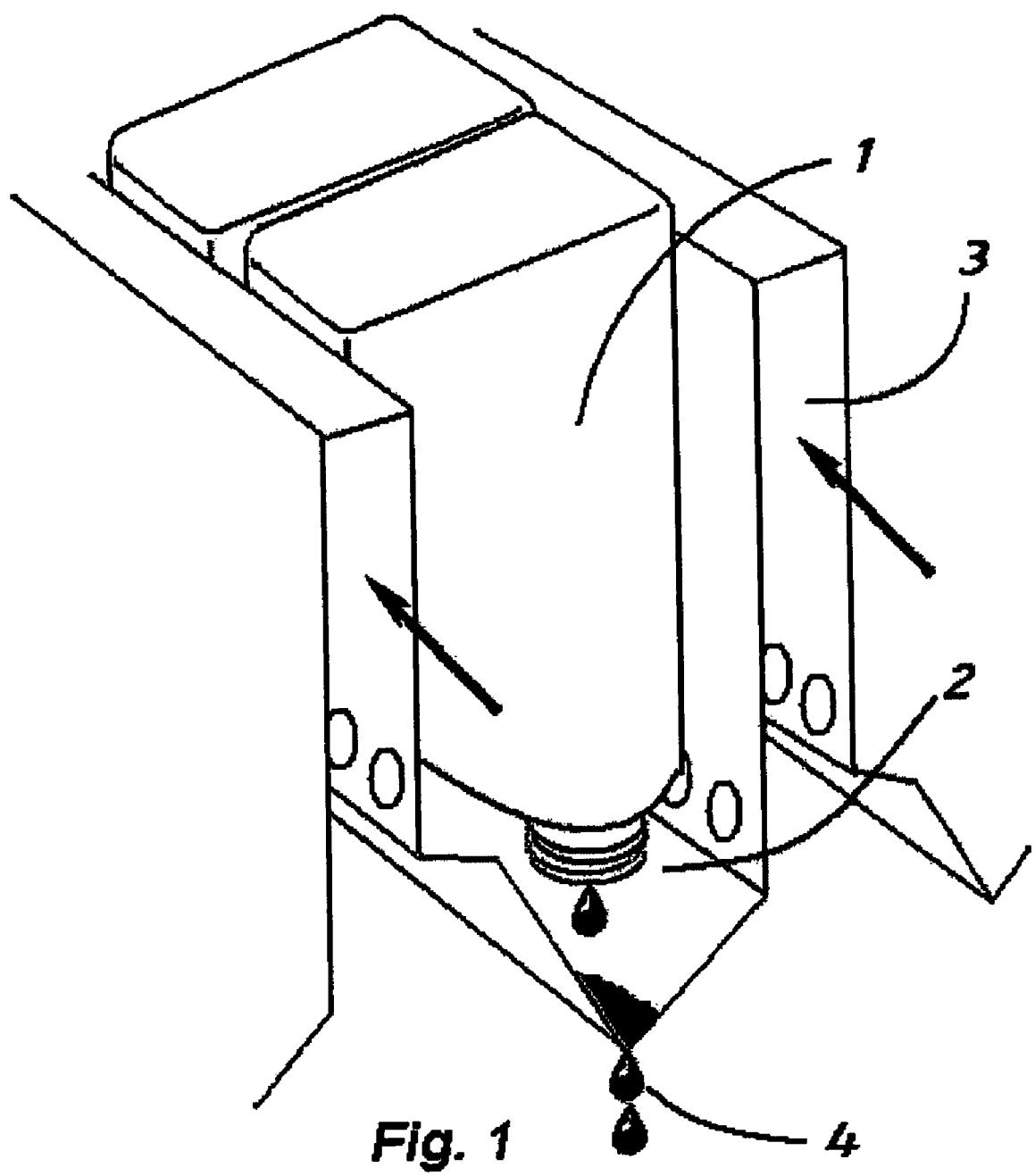
FIG. 1 is a perspective view describing the preferred embodiment for the 'Inclined Heated Slip-Tunnel' for draining those oil remnants free to flow from the used HDPE oil containers.

FIG. 1 shows a perspective view describing the preferred embodiment for the 'Inclined Heated Slip-Tunnel' 2. for draining non-attached oil remnants 4 from the used HDPE oil containers 1. A typical one-quart oil container 1 is shown during the draining process. The containers 1 ordered in line, are both heated by contact with the metal hot sleeve 3 as well as by heated air flowing from small vents at the bottom part of the sleeve 3.

FIG. 1 shows the preferred shape of the slip-tunnel 2, specifically adapted to a branded container 1 shape. The slip-tunnel 2 is surrounded by an air-heated sleeve 3, which also provides some heated air that circulates among the oil containers 1. 'Movable' oil 4 in the container 1 is gravity drained by lowering its viscosity by effect of heat.

Figure 2:
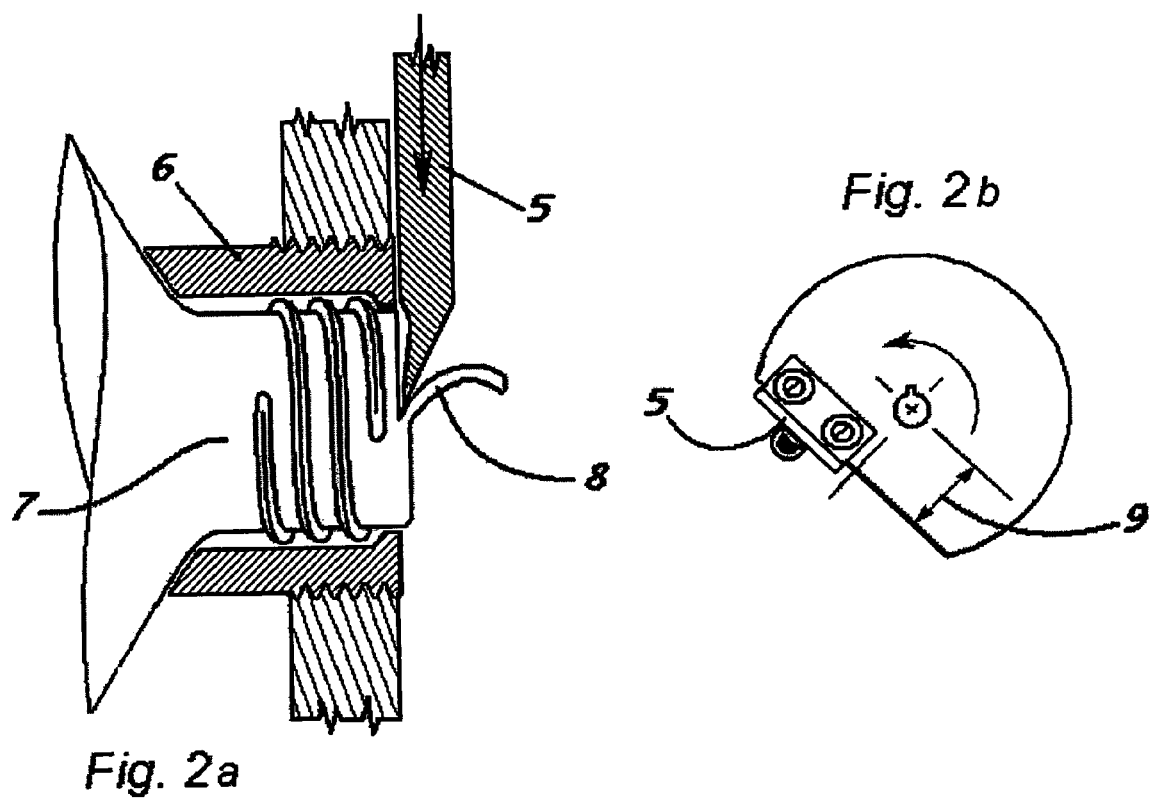
FIG. 2a is a cross section describing the preferred embodiment for the sealing aluminum foil residue cutter.
FIG. 2b shows an end view of the cutter, showing the off-centered non radial cutting blade.

FIG. 2 describes the preferred embodiment for the sealing ring cutter. The neck 7 of the oil container 1 supported by a constricting support spindle 6 (for each brand container's shape) is carefully cut at its neck's end by a high-speed steel blade 5. The typical cutting steel-blade 5 has a non-radial cutting front, which induces a sliding action as well as a cutting action. The attack and relief angles are shown while cutting the container-neck's end 7 and are defined in further detail in FIG. 4. The blade 5 has a sliding action as well as cutting action in order to minimize impact and reduce plastic melting. The blade 5 has a definite attack angle and relief angles as more fully defined in detail in FIG. 4.

FIG. 2a shows a cross section of a spindle 6 for a branded container's shape, which at the same time constricts the neck 7 and limits the depth of cut. The neck 7 represents one example of a branded neck shape inside the support spindle 6 while the plastic ring 8 carrying aluminum sealing residue is being cut by the blade 5.

FIG. 2b shows the geometry of an off-centered cutter blade 5 with the cutter blade 5 mounted at an offset 9.

Figure 3:
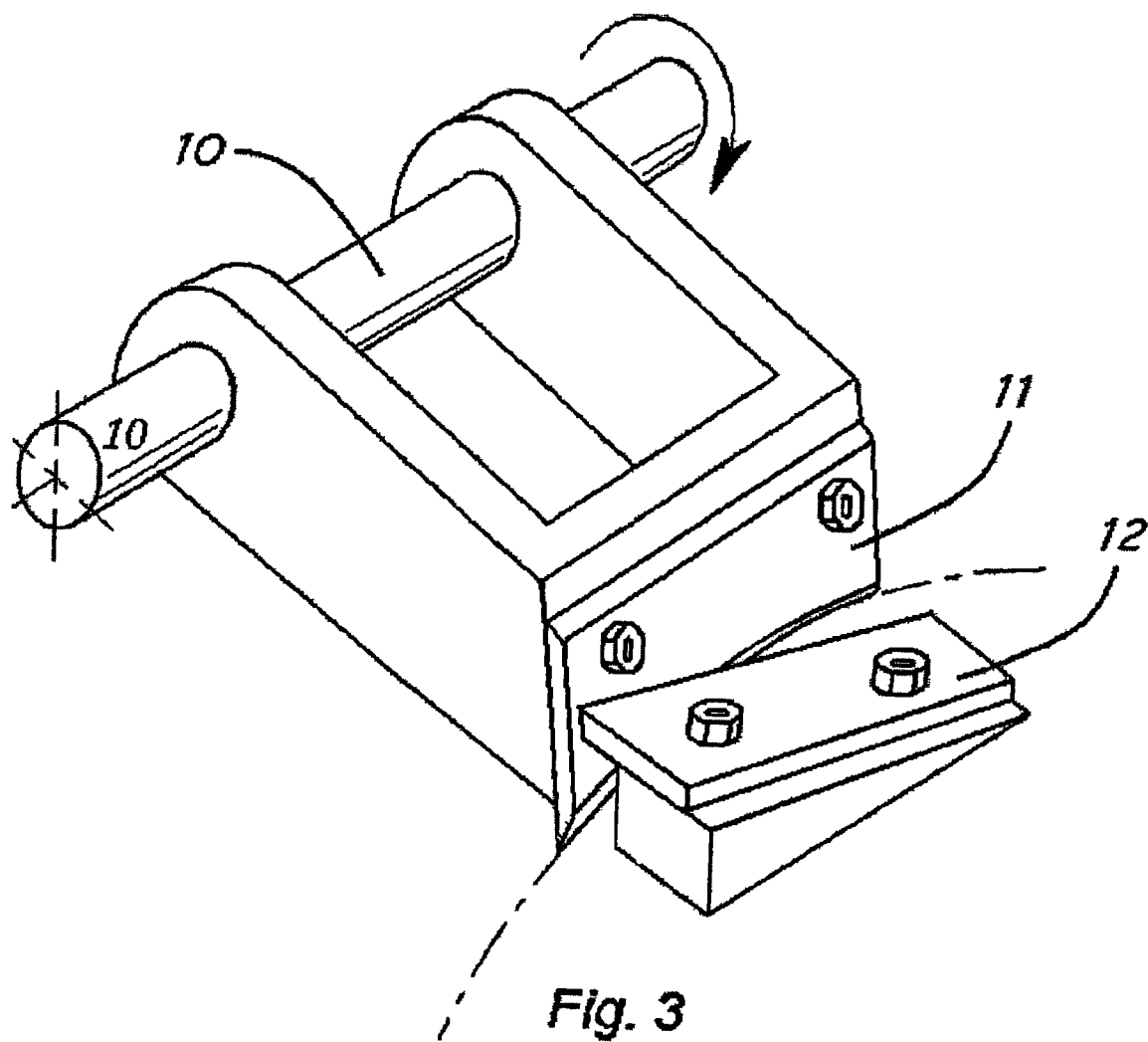
FIG. 3 is a perspective view describing the geometrical aspects of the hyperbolic cutting blade.

FIG. 3 describes the geometrical aspects of the hyperbolic cutting blade 11 as used in a shredder. The need to misalign the shredder's anvil 12, in order to minimize cutting impact capable of melting the plastic, generates an odd form for a cutting blade designed to cut, very close to the anvil 12. This shape corresponds to a hyperboloid of revolution, which demands a hyperbolic shaped blade 11. The attack and relief angles of the blade 11 correspond to the geometry described in FIG. 4. FIG. 3 also shows the relevant elements of a conventional cylindrical rotating shaft 10 and cutter support for a shredder's blade 11 shown as a hyperbolically sharpened blade or hyperbolically supported straight blade, capable of adjusting to an anvil 12 misaligned with respect to the shredder's shaft 10. The misaligned shredder's anvil 12 is designed to generate a progressive cut instead of frontal impact cut.

Figure 4:
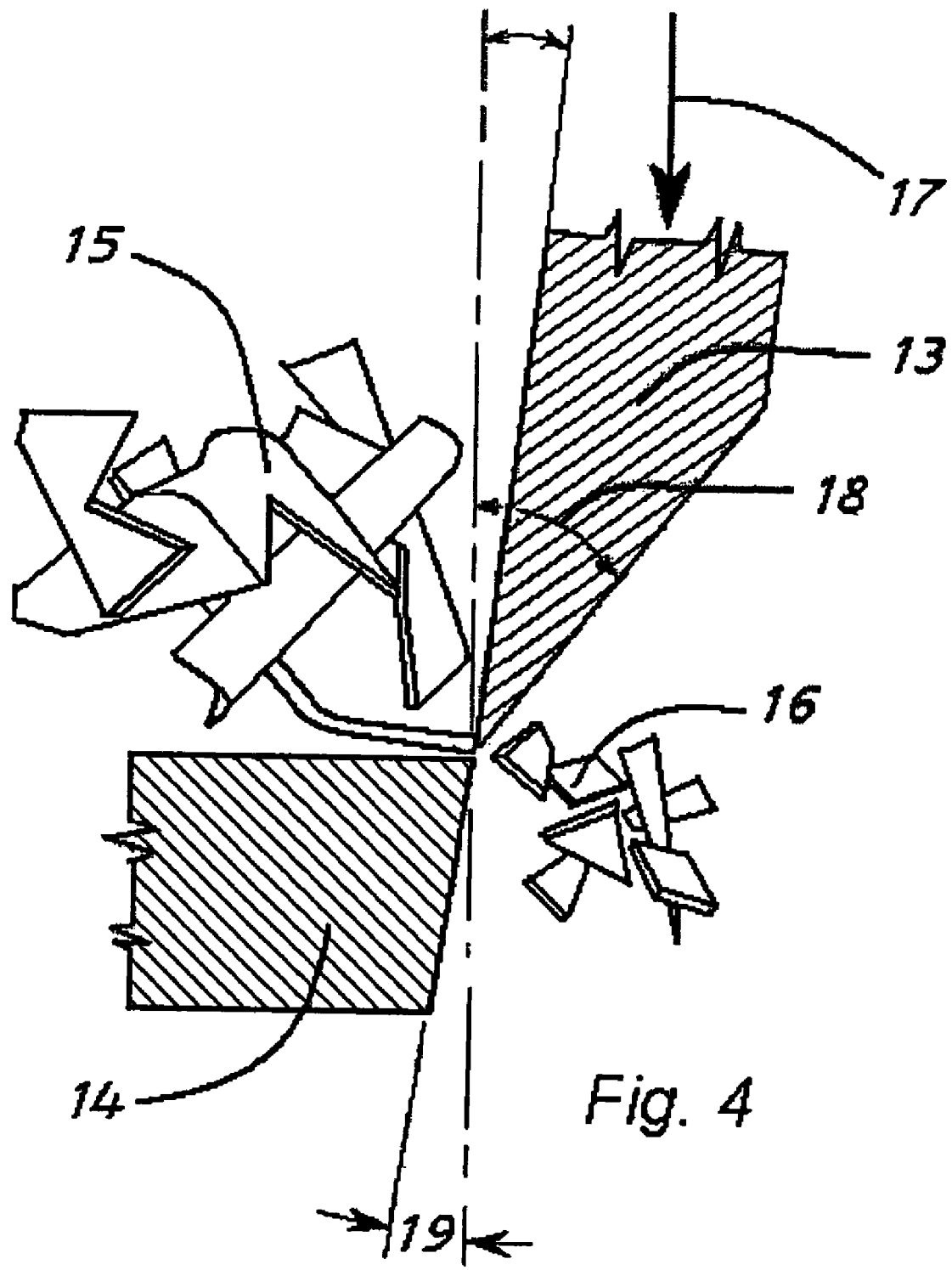
FIG. 4 is a cross section describing the sectional geometry of a cutting blade and an anvil, capable of minimizing the oil entrapment by plastic melting during the cutting process.

FIG. 4 describes the sectional geometry of a cutting blade 13 and an anvil 14, capable of minimizing the oil entrapment by plastic melting during the cutting process. This geometry applies both to the shredder's blade and anvil as described in FIG. 3 and also to the sealing foil remnant cutting blade as shown in FIG. 2. The direction 17 of the rotating blade movement in relation to the static anvil 14 in the moment of the cut is also shown in FIG. 4. It is a cutting speed perpendicular to the anvil's surface.

In the case of the shredder, large oil-container pieces 15 are shown in the process of being re-cut to the final flake size of approximately ½" or less. The shredder initially breaks down the container into big chunks, which are further reduced to the final size by successive cuts until said flakes are able to pass through a typical ⅜" grid. Flake pieces 16 are clean-cut without any sign of adiabatic melting of the HDPE plastic, which has proved to trap sizeable amounts of oil impurities.

The cutting blade's attack angle 18 is shown as the angle between the direction of the cut and the cutting blade's surface. This specific angle for this specific purpose of minimizing plastic melting is claimed in this patent as 39 degrees, plus or minus ten degrees.

The relief angle 19 for both the cutting blade's and the anvil's relief angle for this specific purpose of minimizing plastic melting is claimed in this patent as a relief angle between 2 degrees and 7 degrees.

Figure 5:
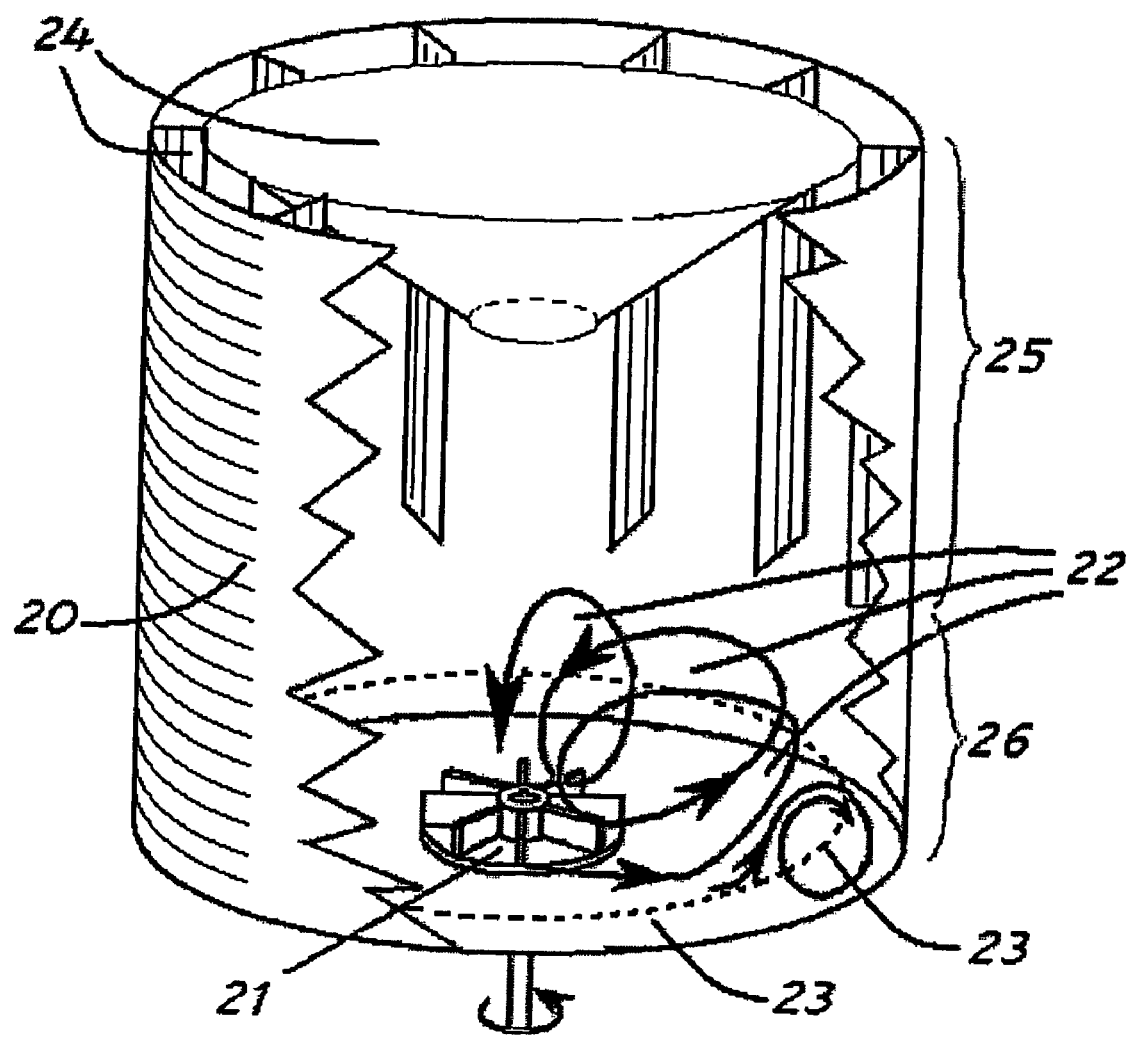
FIG. 5 is a partial cut-away view describing the principal elements of the cylindrical reactor in which oil residues and oil molecules heavily attached to the plastic surface are removed.

FIG. 5 describes the principal elements of the cylindrical reactor in which oil residues and oil molecules heavily attached to the plastic surface are removed. The external and internal geometry of the container-reactor in which the cleaning process occurs is shown. A cylindrical tank 20 surrounded by hot air, steam or hot water, comprises two sections for the AORS bath: an upper semi-still section 25, constrained by vertical screens 24, baffles, some attached to the walls of the reactor, some of a cylindrical and/or conical shape, suspended in the central part (not totally shown to clarify the figure), and a lower high turbulence section 26, subjected to the direct action of the rotor 21 and the eddy cavitation-flows, naturally generated.

A typical open rotor 21 shown with straight blades (although backward or forward blades can be used on other geometries) absorbs the AORS solution at its center and radially and tangentially projects the AORS solution towards the limits of the tank and the upper screens. Flow vanes can further provide special direction around and over the rotor.

When leaving the rotor, the AORS solution has two equivalent velocities, on one hand, a radial velocity that projects the flow back to the rotor when it encounters the cylinder of the reactor and the upper screens and, on the other, a tangential velocity that forces the liquid to rotate around the bottom of the reactor. These two velocities, when combined, generate a doughnut shaped flow 22 (torus shaped) of high turbulence and also induces eddy turbulences of a different kind.

The small vortex and the dotted line shown, represents another eddy torus shaped flow 23, also with a doughnut shape, which swirls over itself, at a very high speed around the external bottom corner of the reactor. This toroidal vortex, in absence of air increases its speed in proportion to the inverse of its radius. When this speed induces a low pressure capable of boiling the AORS solution, the torus fills with water vapor. The continuous vaporization and collapse of steam bubbles in this toroidal shaped stream actively contributes to free those oil molecules trapped on the plastic's surface.

The simplest form of vertical screens 24 shown in FIG. 5 are used to reduce axial and circular rotation of the AORS. In order to further reduce that rotation and to minimize turbulent flow in the upper semi-still section 25 of the reactor, cylindrical, conical and flat horizontal screens or baffles, are also used depending on the size of the reactor. The objective of these screens is to prevent the formation of free vortices that could introduce air into the high turbulence under-section, as air would impair internal cavitation and would enhance foam formation. The upper semi-still section 25 of the reactor is designed to reduce rotation and vorticity induced by the rotor 21 to a smooth down flow, and as an air seal for the reactor. The limits of the lower high turbulence section 26 of the reactor are also shown.

Figure 6:
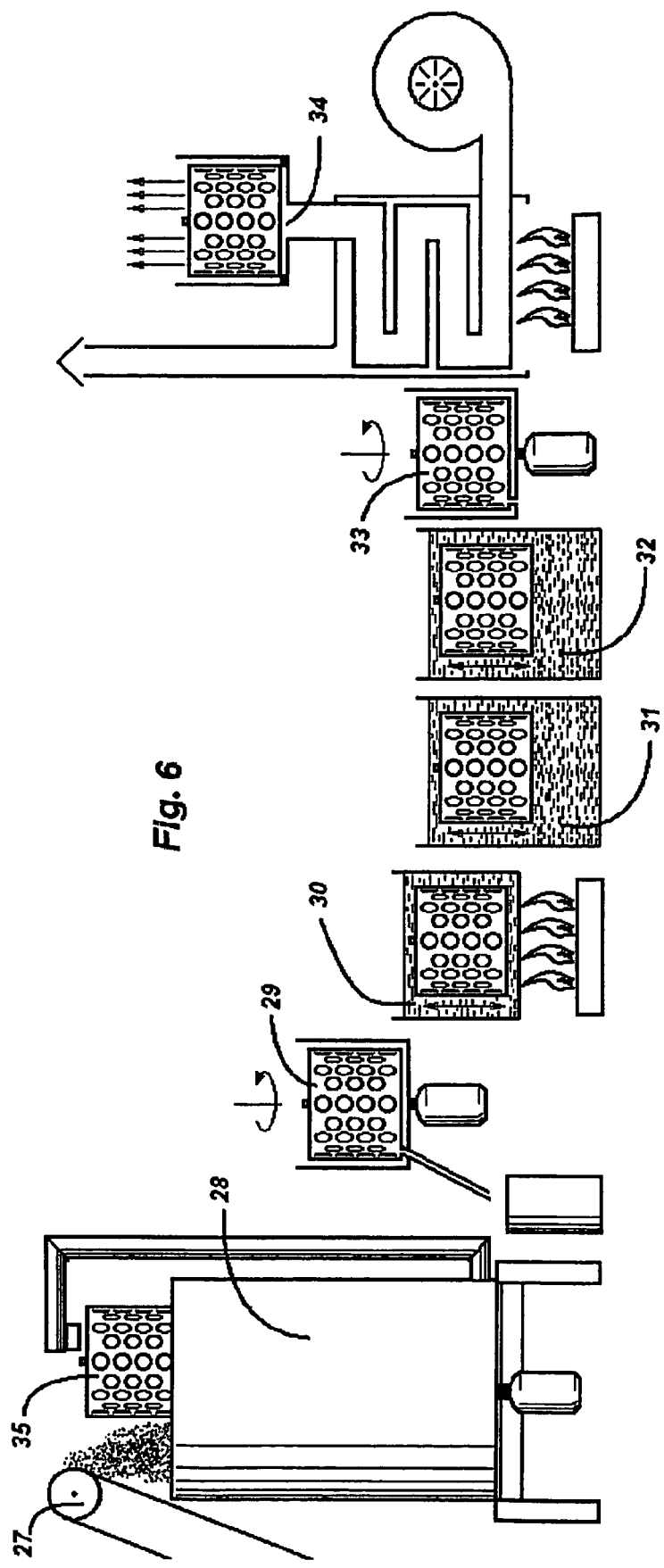
FIG. 6 is a process diagram showing those processes that follow the oil removing in the reactor, in order to wash AORS solution remnants as well as the final drying of the clean flakes, in the preferred batch embodiment.

Those processes that follow the oil removing in the reactor, necessary to wash AORS solution remnants as well as the final drying of the clean flakes are illustrated in FIG. 6 as a sequence, in the preferred batch embodiment. In this figure, the most elementary batch elements are shown; as they most easily describe the different steps, as compared with other alternative continuous processes.

As shown in FIG. 6, the shredded flakes are batch or continuously loaded in the reactor by any method 27. Note that the flakes are loaded in the semi-static section 21 of the reactor 28. FIG. 6 shows the external configuration of a batch AORS reactor 28, including the rotor's motor and the submerged extraction of clean flakes at the high turbulence sector.

Step 29 shows a scheme of the centrifugation process that recuperates the remnants of the AORS solution still attached to the plastic flakes.

Step 30 shows the elements of the hot water washing of the flakes which are soaked in boiling water after centrifugation, to further remove concentrated AORS remnants.

Step 31 shows the first, low AORS concentration, water rinse in which dissolved AORS remnants are further removed.

Step 32 shows the second, ultra low AORS concentration, water rinse in which dissolved AORS particles are almost totally eliminated to a 'parts per million level'

Step 33 shows a scheme of the second centrifugation process that eliminates most of the water still attached to the plastic flakes to facilitate drying.

Step 34 describes the simplest flake drying configuration in which hot air from a heat exchanger is forced through the flakes. After this process, the clean and dry plastic flakes are dumped into the packing bin.

Above the high turbulence reactor is shown the typical perforated cylindrical batch container 35 which serves as an AORS solution drainer over the reactor; as a centrifugation container; as a hot washing container, as a cold washing container and as a hot air drying container.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the claims presented.

What is claimed is:

1. A method for recycling high density polyethylene plastic from used engine-oil containers with a paper label having an impermeable gloss surface attached by label adhesive to the container, a neck with an end and a neck axis and with sealing foil residue and adhesive still attached to the end of the neck of the container, comprising the steps of:
   a) emptying any free flowing residual oil from the engine-oil containers by centrifugal acceleration, in an environment between room temperature and 240 degrees F.;
   b) melting the sealing foil residue adhesive, from the container's neck, by rapid heating of the neck with hot air, liquid, steam or superheated steam, at temperatures between 140 degrees F. and 240 degrees F.;
   c) removing the sealing-foil residue after heating by a brush or a rotating blade having an axis coinciding with the container's neck axis;
   d) softening the label adhesive by a sudden application of water, heated between 140 degrees F. and 212° degrees F.;
   e) removing the softened label, by the sliding action of a blade coated with Teflon;
   f) shredding the container into flakes with a hardened steel cutting blade mounted on a support rotating on a shaft, said cutting blade cutting across a disaligned hardened steel anvil;
   g) generating a high turbulence bath by the action of continuous or intermittent high velocity submerged jets of an adhered oil removal solution impinging the flakes;
   h) subjecting the flakes to a high turbulence pressurized toroidal recirculation hot-bath, filled with said adhered-oil removal solution at temperatures between room temperature and 250 degrees F.;
   i) separating any molecularly attached oil, contaminating the flakes in the adhered oil removal solution hot bath, and extracting and drying of the flakes subjected to said separation by the action of hot air by a forced flow through the flakes.

2. The method of claim 1 where the step of removing the sealing-foil residue comprises removal by a direct blow of high-speed steam.

3. The method of claim 1 where the step of softening the label adhesive comprises a sudden application of high velocity airflow between 140 degrees F. and 250 degrees F.

4. The method of claim 1 where the step of softening the label adhesive comprises a sudden application of high velocity steam or superheated steam bath or jet.

5. The method of claim 1 where the step of softening the label adhesive further comprises scratching the label's impermeable gloss surface with cutting blades or a wire brush, to further allow the action of a commercial solvent on the adhesive for the further removal of the label.

6. The method of claim 1 where the step of drying of the flakes comprises the action of hot air in a fluidized bed, in a free flow drying tower or in a tumbling mechanism.

7. The method of claim 1 where the step of removing the sealing-foil residue after heating by a rotating blade with its axis coinciding with the container's neck axis further comprises a high velocity rotating hardened steel cutting-blade with a cutting edge and with a support shaft that slices off a ring of high density polyethylene plastic at the end of the container's neck, and further comprises locating said hardened steel cutting blade on a non radial position with respect to the cutting blade support's shaft in order to induce a sliding action cut, capable of reducing impact and adiabatic melting of the high density polyethylene plastic in front of the cutting edge; and said step further comprises constricting the container's neck by an internal and/or external brand-adapted cylindrical spindle, to keep the shape of the container's neck during the step of removing any sealing-foil residue; and said step further comprises the cutting blade having an attack-angle of 39 degrees, plus or minus ten degrees, in order to reduce adiabatic melting of the high density polyethylene plastic to further prevent capturing undesirable engine oil in surfaces cut by the blade, and the cutting blades and the spindles presenting a 'relief angle' of 2 degrees to 7 degrees to further reduce the chance of melting friction chips during the removal operation.

8. The method of claim 7 further comprising the steps of;
   a) removing the label further comprises softening any label adhesive, by surrounding the labeled container with hot air, with or without solvent vapors in a flow between 140 degrees F. and 250 degrees F., and removing the label, after said softening of label adhesive, by the sliding action of a smooth wide blade or a rotating brush, and removing any adhesive residues still attached to the container after the removal of the label and the removal of any sealing-foil residue, by application of a commercial solvent;
   b) cutting used engine oil containers into flakes with a maximum width of approximately ⅜" or less, after removal of the label and any sealing-foil residue in an oil free flake-cutting process, to avoid trapping oil by high density polyethylene plastic melting at surfaces cut by blades, as well as undesirable impact, where the anvil against which the high density polyethylene plastic is cut, is purposely not aligned with the cutting blade shaft to induce a scissors' effect, and the blades are shaped approximating as an 'hyperbola of revolution' in order to fit the misaligned anvil during its rotation, and the cutting blade has an attack-angle of 39 degrees, plus or minus ten degrees, in order to reduce adiabatic melting of the high density polyethylene plastic to further prevent capturing undesirable engine oil in the surfaces cut by the blades, and the cutting blades and the anvils presenting a 'relief angle' of 2 degrees to 7 degrees to further reduce the chance of melting friction chip during the cutting operation;
   c) preparing an adhered oil removal solution based on 2 percent to 60 percent content of linear sulfonic acid or another strong detergent and up to 5 percent of a commercial solvent, all dissolved or emulsified in water by action of the adhered oil removal solution detergency;
   d) subjecting the oil-contaminated flakes in the adhered oil removal solution to a rotor-induced high turbulence toroidal re-circulation underflow at temperatures between 120 degrees F. and 212 degrees F. inside a cylindrical reactor tank having an upper section of quasi-still adhered oil removal solution, being induced by flat and/or cylindrical or conical screens, which minimize the rotation and vortex formation of the liquid and a submerged high turbulence section where oil separation occurs, where the upper quasi-still section with small re-circulation serves as a gas seal to prevent contamination of the high turbulence underflow with air, as well as a fluid trap to safely introduce said plastic flakes;
   e) generating said high-turbulence underflow of the adhered oil removal solution by the action of a high velocity open rotor operating at 10 to 110 ft./sec at the bottom of a cylindrical reactor, capable of inducing a 'main spiral-toroidal recirculation' of the solution where the adhered oil removal solution continuously returns to the rotor by effect of the cylindrical constraints of the tank's shape as well as by the influence of flat and/or circular vertical screens in the upper quasi-still flow section, which screens are set at an appropriate height to permit under turbulent whirl;
   f) generating an extreme low-pressure peripheral eddy-turbulence ring within the high turbulenance section, capable of rapid evaporating/condensing of the adhered oil removal solution, by the effect of residual eddy circulation rotating in the opposite direction to the main spiral-toroidal flow;
   g) subjecting the adhered oil removal solution during the hot bath process, to ultrasound frequency vibration between 15,000 cycles and 50,000 cycles per second with intensity equal to or higher to 1 watt of free energy per gallon of the adhered oil removal solution;
   h) extracting the flakes after the hot bath, by a submerged surge located under a level of contaminated floating sludge covering the adhered oil removal solution, and recuperating part of the adhered oil removal solution still covering the extracted flakes by further centrifugation;
   i) protecting the integrity of the contaminated floating sludge from the effects of turbulence by submerged horizontal flat and/or conical screens and/or baffles and sinks at the top of the cylindrical reactor tank, which isolate the dynamic conditions in the upper section from the high turbulence in the lower section of the reactor tank;
   j) soaking the extracted flakes in hot water to remove any remaining adhered oil removal solution still attached after centrifugation;
   k) washing any remnants of the adhered oil removal solution, attached to the flakes after soaking, by subsequent batch baths, in increasingly pure cold or hot water tanks; drying the washed flakes by the action of pressurized hot air on a static or a fluidized bed;
   l) regenerating the adhered oil removal solution, after individual or repeated flake cleaning operations, by reducing its temperature to room conditions or less, in order to mechanically separate floating oil-sludge from the regenerated solution.

9. The method of claim 1 where the step of shredding the container into flakes further comprises cutting used engine oil containers into flakes with a maximum width of ½" or less, after the removal of the label and any sealing-foil residue in an oil free flake-cutting process, to avoid trapping oil by high density polyethylene plastic melting at surfaces cut-off by the blades, as well as undesirable impact, where the anvil against which the plastic is cut, is purposely not aligned with the cutting blade shaft to induce a scissors' effect, and the blades being shaped and/or being supported approximating an 'hyperbola of revolution' in order to fit the misaligned anvil during its rotation, and the cutting blade having an attack-angle of 39 degrees, plus or minus ten degrees, in order to reduce adiabatic melting of the high density polyethylene plastic to further prevent capturing undesirable engine oil in the surface cut-off by the blades, and the cutting blades and the anvils presenting a 'relief angle' of 2 degrees to 7 degrees to further reduce the chance of melting friction chips during the cutting operation.

10. The method of claim 1 where the step of separating any molecularly attached oil contaminating the flakes in an adhered oil removal solution hot bath and extracting and drying of the flakes after separating said oil further comprises:
   a) preparing an adhered oil removal solution based on 2 percent to 60 percent content of linear sulfonic acid or another strong detergent and up to 5 percent of an organic commercial solvent, all being dissolved or emulsified in water by action of the adhered oil removal solution detergency;
   b) subjecting the oil-contaminated flakes in the adhered oil removal solution to a rotor-induced high turbulence toroidal re-circulation underflow at temperatures between 120 degrees F. and 212 degrees F. inside a cylindrical reactor tank having an upper section of quasi-still adhered oil removal solution, being induced by flat and/or cylindrical or conical screens, which minimize the rotation and vortex formation of the liquid to a smooth down flow, and a submerged high turbulence section where oil separation occurs, where the upper quasi-still section with small re-circulation serves as a gas seal to prevent contamination of the high turbulence underflow with air, as well as a fluid trap to safely introduce the flakes;
   c) generating high-turbulence underflow of the adhered oil removal solution solution by the action of a high velocity open rotor operating at 10 to 110 ft./sec at the bottom of a cylindrical reactor, capable of inducing a main spiral-toroidal recirculation of the solution where the adhered oil removal solution continuously returns to the rotor by effect of the cylindrical constraints of the tank's shape as well as by the influence of flat and/or circular vertical screens in the upper quasi-still flow section, which screens are set at an appropriate height to permit under turbulent whirl;
   d) generating an extreme low-pressure peripheral eddy-turbulence ring within the high turbulenance section, capable of rapid evaporating/condensing of the adhered oil removal solution, by the effect of residual eddy circulation rotating in the opposite direction to the main spiral-toroidal flow;
   e) subjecting the adhered oil removal solution during the hot bath process, to ultrasound frequency vibration between 15,000 cycles and 50,000 cycles per second with intensity equal to or higher to 1 watt of free energy per gallon of the adhered oil removal solution;
   f) extracting the flakes after the hot bath, by a submerged surge located under a level of contaminated floating sludge covering the adhered oil removal solution, and recuperating part of the adhered oil removal solution still covering the extracted flakes by further centrifugation;
   g) protecting the integrity of the contaminated floating sludge from the effects of turbulence by submerged horizontal flat and/or conical screens and/or baffles and sinks at the top of the cylindrical reactor tank, which isolate the dynamic conditions in the upper section from the high turbulence in the lower section of the reactor tank;
   h) soaking the extracted flakes in hot water to remove any remaining adhered oil removal solution still attached after centrifugation;
   i) washing any remnants of the adhered oil removal solution, attached to the flakes after soaking, by subsequent batch baths, in increasingly pure cold or hot water tanks;
   j) drying the flakes after washing by the action of pressurized hot air on a static or a fluidized bed.

11. The method of claim 1 where the step of emptying any free flowing residual oil from the engine-oil containers further comprises placing the containers upside down in an inclined heated slip tunnel maintained in an environment between room temperature and 240 degrees Fahrenheit and draining any non-attached oil remaining in said container.

* * * * *